Dec. 17, 1940. L. E. ADLER Re. 21,659

TELEPHONE SIGNAL SYSTEM

Original Filed May 25, 1936

Inventor
Lee E. Adler

By Jack Ashley
Attorney

Reissued Dec. 17, 1940

Re. 21,659

UNITED STATES PATENT OFFICE 21,659

TELEPHONE SIGNAL SYSTEM

Lee E. Adler, Dallas, Tex.

Original No. 2,099,250, dated November 16, 1937, Serial No. 81,611, May 25, 1936. Application for reissue December 2, 1938, Serial No. 243,630

7 Claims. (Cl. 179—84)

This invention relates to telephone signal systems and other signal systems electrically operated from any source of alternating current.

While the invention has been found particularly applicable to a telephone signal system, it may be readily employed, as above stated, to control the various functions in other signal systems such as a traffic signal system, wherein signal control devices or relays are used.

The invention consists substantially in the combination of certain well known electrical and mechanical principles so related and located electrically with respect to each other that new and novel purposes are achieved in operating signal relays, signal drops and other electromagnetic signal apparatus which ordinarily function efficiently only with direct or uni-directional current.

An object of this invention is to increase the sensitivity of the signal relays within a definite band of frequencies and to exclude from the signal relay circuit all other frequencies.

A further object is to provide means for adjusting the amount of energy supplied to the relay and to prevent the signal relay circuit from absorbing audio frequency currents, including speech and music transmission frequencies.

Still another object of the invention is to provide an improved means for operating a signal control device, such as a relay, by a desired frequency which may be selected from a source of alternating current, whereby all other frequencies are excluded and will not operate the control device; such means being applicable to an electrically operated traffic signal system to control various functions in the traffic signal operation by operating the various control devices of said system through the transmission of various frequencies.

A particular object of the invention is to provide improved operating means for an electrically operated control device which includes a frequency selector in the form of a filter which is connected to a source of alternating current, and a rectifier interposed between the filter and the control device, whereby desired frequencies from the source of current are permitted to pass to the rectifier and control device to operate the same, while unwanted frequencies are excluded and cannot affect the control device, thus making it possible to connect a plurality of control devices to the single source of current supply and to actuate each of such devices individually by a predetermined frequency, whereby each device is controlled by its individual frequency and may be operated without affecting operation of the remaining devices in the circuit.

A system designed to carry out the invention will be hereinafter described, together with other features of the invention.

The invention will be more readily understood from a reading of the following specification and by reference to the accompanying drawing, in which an example of the invention is shown, and wherein.

Figure 1:
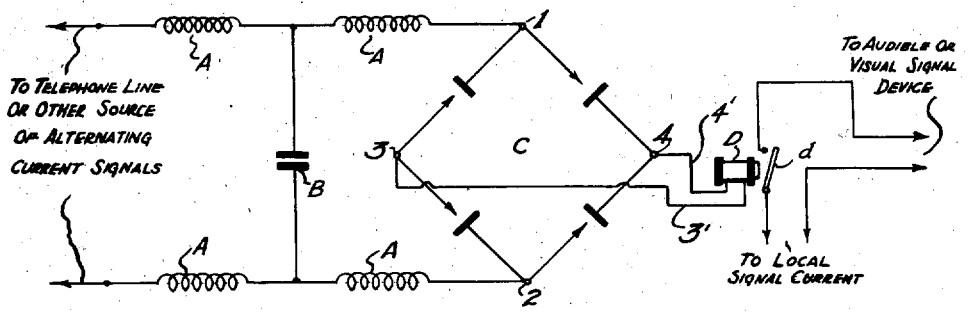
Figure 1 is a circuit diagram showing one combination in accordance with the invention wherein signal currents are permitted to enter the signal apparatus but from which the audio frequencies are barred.

Referring now more particularly to Figure 1 of the drawing, the inductances, indicated at A, in combination with the capacitor or condenser, indicated at B, form a frequency selector or resonant circuit whereby certain alternating-current frequencies are allowed to pass with ease, while certain unwanted frequencies are electrically prevented from passing through the combination of inductances and capacitor or condenser. The frequency selector is, in effect, a filter which allows only a predetermined frequency or frequencies to pass. A typical example is represented in a telephone system wherein the current used for signalling would have a frequency of, say, 16 to 20 cycles per second, whereas, the frequencies used for intelligible speech transmission usually cover a range of 100 cycles and upward. In such a case, the inductance element A and capacitor or condenser element B would be so designed that the low frequency signal current would be able to pass into the devices C and D, to be presently described, at less than 100 cycles, while the speech frequencies of 100 cycles to 3000 cycles or higher, would be unable to enter said devices C and D.

The frequency selector is illustrated as comprising the inductances A, cross connected by the condenser or capacitor B but it is pointed out that the invention is not to be limited to this specific construction for it would be possible to rearrange the elements and still accomplish the purpose.

So long as the inductance or inductances and capacitor, or capacitors are correlated to form a frequency selector which will permit passage of a desired frequency, or band of frequencies, to the exclusion of all other frequencies, the objects of the invention will be carried out.

The part of the diagram indicated at C represents a device capable of rectifying or converting the alternating current entering at the points 1 and 2 to uni-directional or pulsating direct current emerging from the points 3 and 4. Any known form of rectifying device, including the copper oxide disk type, may be employed in the system as element C.

The rectified current is fed from the rectifying or converting device C into the element D which may be a signal relay, drop or other electrical device capable of being efficiently actuated by the rectified current. The device D when actuated operates to form a local circuit to give an audible or visual signal in unison with the signal energy received from the line or source of ultimate signal current. The device D is illustrated as closing a local electrical circuit to an audible or visual signal but it is pointed out that said device may close an electrical circuit to a relay, or other electrical apparatus.

Figure 2:
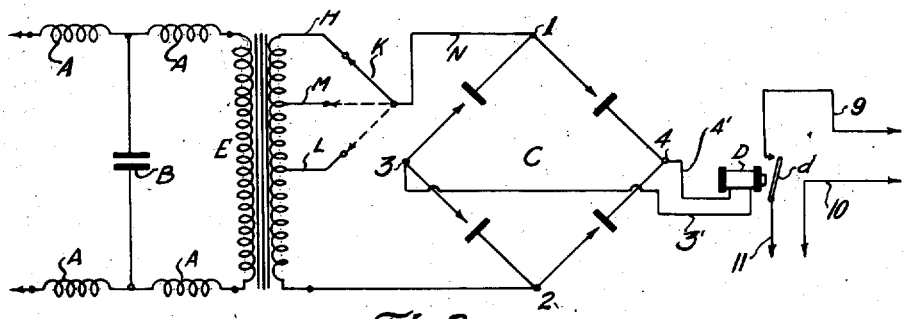
Figure 2 is a circuit diagram showing the same combination as in Figure 1 but with the provision of an additional device to regulate the amount of signal energy fed into the electromagnetic signal apparatus and to insulate the rectifying device from the line.

In the modified adaptation of the invention illustrated in the diagram in Figure 2 of the drawing, the operating features are the same as in the diagram illustrated in Figure 1, with the addition of an adjustable ratio transformer E interposed between the inductances A and capacitor or condenser B and the rectifier C. The purpose of this transformer E is threefold: first, to adjust the voltage across input of the rectifier to within safe limits as regards the handling capacity of the rectifier; second, to raise or lower the signal voltage fed into the device D that controls the local signal circuit, whereby to insure the positive operation of said device D on weak signals and its prompt release after strong signals, as the case may require; third, to insulate the rectifier element from direct connection to the line or source of signal current, thereby helping to protect the rectifying device from excessive surges of lightning or other abnormal currents. The variable voltage feature of the device E consists in a plurality of secondary winding taps, L, M and H, by means of which the secondary voltage may be varied at will, either by a variable switch, as at K, or by merely moving the circuit wire N from one tap to another.

Figure 3:
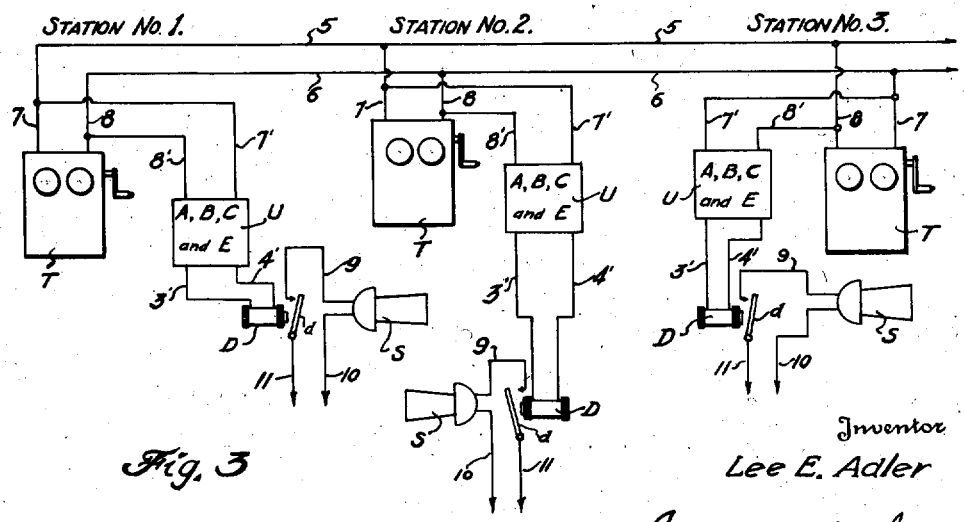
Figure 3 is a diagram illustrating a typical application of the invention on a long distance telephone line.

The diagram in Figure 3 of the drawing illustrates a typical and practical adaptation or application of the invention on a long distance telephone line. In the diagram three separate stations are indicated, namely, station #1, station #2 and station #3. In each of the stations indicated in the diagram and all others that might be included on the line, the arrangements are the same, therefore, the description of one station will suffice. At each station, there is installed a standard magneto telephone, indicated at T, the instrument being connected to the line tensions 7', 8', of said connections 7, 8, the leads to the inductances A of the diagrams illustrated in Figures 1 and 2 are also connected to the line wires 5, 6. The working set of elements A, B and C, as shown in Figure 1, or the set including the element E in the combination illustrated in Figure 2, as the case may be, are included in a unit, indicated at U, in Figure 3, and the rectifier element C of said unit is connected to the relay D by the wires 3', 4'. The circuit closer *d* of the relay D controls the local circuit 9, 10 and 11, of the signal device, indicated at S, and which, obviously, may be either audible or visual, or both.

With the above arrangement, a predetermined, desired frequency may be employed for operating the relays D of the various stations #1, #2 and #3 and by constructing the frequency selector of each station in such a manner as to permit the passage of the same frequency, the relays of all the stations may be operated simultaneously. Also, it is manifest that if it is desired to close other local circuits at each station, then other relays, similar to the relay D, may be connected to the main wires 5 and 6. These additional relays may have their frequency selectors constructed so that such relays could be actuated by a frequency, other than the frequency which operates the first mentioned relays D, shown in the drawings. Since the particular frequency or band of frequencies which operates the relay D of any one unit U is determined by the construction of the frequency selector or filter of that relay, the construction of the selector or filter controls the frequency which will operate the relay of said unit. If desired, each relay D may be actuated by its own frequency and, in such event, the relays would not operate simultaneously but would be operated individually. The relays D have been illustrated as closing a local circuit to an audible signal S in Figure 3, but said relays could be utilized to close a local circuit to an operating relay (not shown) for performing any desired function.

Obviously, the combination of principles of the present invention may be embodied in various arrangements other than those herein illustrated and various changes in the details might readily occur to others skilled in the art and still fall within the spirit and scope of the invention, as defined in the appended claims. The invention, therefore, is not limited to the specific adaptations illustrated in the accompanying drawing, as said invention may be used with signal systems other than telephone signal systems, as for example, a traffic signal system.

What I claim and desired to secure by Letters Patent is:

1. In a telephone system, the combination of an electrical signal device, a normally open local electrical circuit for said signal device, a relay for closing said local circuit, a source of alternating current from which the current for operating said relay is taken, and means between said source of alternating current and said relay for selecting the desired frequencies of signalling current from said source, said means comprising two separate parallel pairs of connected inductances, one inductance of each pair directly connected to the source of alternating current and the other inductance of the pair connected to a rectifier, a condenser directly cross-connected between said two parallel pairs of inductances, and a direct connection between said rectifier and said circuit-closing relay whereby said relay is energized by predetermined low frequency signal current and relatively higher frequency current in the system is prevented from affecting the relay.

2. In a telephone system, a source of alternating current, an electrical signal controlling device, and means for selecting desired frequencies from said source of alternating current and changing the same to uni-directional or pulsating direct current to operate said signal controlling device, said means comprising parallel inductances directly cross-connected by a condenser, said inductances directly connected at one end to the source of alternating current and at the opposite end connected to a rectifier, said rectifier directly connected to the signal controlling device.

3. In a telephone system, a source of alternating current, an electrical signal controlling device, and means for selecting desired frequencies from said source of alternating current and changing the same to uni-directional or pulsating direct current to operate said signal controlling device, said means comprising a rectifier directly connected to the signal controlling device, parallel inductances directly cross-connected by a condenser, an adjustable ratio transformer interposed directly between said inductances and said rectifier, the rectifier having a variable tap connection with the secondary winding of said transformer and said inductances being connected at one end to the primary winding of said transformer and at the opposite end directly to the source of alternating current.

4. In a signal system of the character described, a source of alternating current, an electrical signal controlling device, and means for selecting desired frequencies from said source of alternating current and changing the same to uni-directional or pulsating direct current to operate said signal controlling device, said means comprising a rectifier directly connected to the signal controlling device, an inductance and condenser, an adjustable ratio transformer interposed between the inductance and the rectifier, said rectifier having a variable tap connection with the secondary winding of said transformer and said inductance being connected at one end to the primary winding of the transformer and at the opposite end directly to the source of alternating current.

5. A signal system including a multiplicity of signal stations connected therewith, said system having a multiplicity of signal circuits distributed among the stations, which circuits are subject to alternating currents of different frequencies imposed on the system, a translating device for a signal appliance connected with each of said distributed signal circuits, a band pass filter associated with each of said circuits and its signal translating device whereby the operation of the signal appliance is responsive to a particular frequency imposed on the system in accordance with the band pass frequency selection of its filter, said band pass filter comprising two separate parallel pairs of connected inductances, one inductance of each pair directly connected to the source of alternating current and the other inductance of the pair connected to a rectifier, a condenser directly cross-connected between said two parallel pairs of inductances, and a direct connection between said rectifier and said translating device, and an adjustable transformer at each station associated with said frequency signaling circuits, said transformers at the successive stations along the system having variably tapped windings whereby their adjustments with respect to the signal circuits at the different stations may be varied different amounts for adjustment to equalize the operating potentials to the proper amounts at the successive signal stations along the system.

6. A signal system including a multiplicity of signal stations connected therewith, said system having a multiplicity of signal circuits distributed among the stations, which circuits are subject to alternating currents of different frequencies imposed on the system, a translating device for a signal appliance connected with each of said distributed signal circuits comprising a D C relay, a band pass filter associated with each of said circuits and its signal translating device whereby the operation of the signal appliance is responsive to a particular frequency imposed on the system in accordance with the band pass frequency selection of its filter, a rectifier interposed in each circuit between the D C relay and the band pass filter, said band pass filter comprising two separate parallel pairs of connected inductances, one inductance of each pair directly connected to the source of alternating current and the other inductance of the pair connected to a rectifier, a condenser directly cross-connected between said two parallel pairs of inductances, and a direct connection between said rectifier and said translating device, and an adjustable transformer at each station associated with said frequency signaling circuits, said transformers at the successive stations along the system having variably tapped windings whereby their adjustments with respect to the signal circuits at the different stations may be varied different amounts.

7. A signal system including a multiplicity of signal stations connected therewith, said system having a multiplicity of signal circuits distributed among the stations, which circuits are subject to alternating currents of different frequencies imposed on the system, a translating device for a signal appliance connected with each of said distributed signal circuits, a band pass filter associated with each of said circuits and its signal translating device whereby the operation of the signal appliance is responsive to a particular frequency imposed on the system in accordance with the band pass frequency selection of its filter, said band pass filter comprising two separate parallel pairs of connected inductances, one inductance of each pair directly connected to the source of alternating current and the other inductance of the pair connected to a rectifier, a condenser directly cross-connected between said two parallel pairs of inductances, and a direct connection between said rectifier and said translating device, and means at each station for varying the signal potential applied to the various frequency signaling circuits with respect to each of the others of the system whereby adjustment may be made to equalize the operating potentials to the proper amounts at the successive signal stations along the system.

LEE E. ADLER.